US012685403B2

(12) United States Patent
Roesler et al.

(10) Patent No.: US 12,685,403 B2
(45) Date of Patent: Jul. 21, 2026

(54) FILTER HOLDER AND COFFEE MACHINE

(71) Applicant: 10X Innovation GmbH & Co. KG, Berlin (DE)

(72) Inventors: Jan Roesler, Berlin (DE); René Korte, Hannover (DE)

(73) Assignee: 10X Innovation GmbH & Co. KG, Berlin (DE)

( * ) Notice: Subject to any disclaimer, the term of this patent is extended or adjusted under 35 U.S.C. 154(b) by 754 days.

(21) Appl. No.: 18/024,294

(22) PCT Filed: Sep. 2, 2021

(86) PCT No.: PCT/EP2021/074266
§ 371 (c)(1),
(2) Date: Mar. 2, 2023

(87) PCT Pub. No.: WO2022/063544
PCT Pub. Date: Mar. 31, 2022

(65) Prior Publication Data
US 2023/0329473 A1     Oct. 19, 2023

(30) Foreign Application Priority Data

Sep. 24, 2020     (DE) ..................... 10 2020 124 966.7

(51) Int. Cl.
*A47J 31/06*          (2006.01)
(52) U.S. Cl.
CPC ................................. *A47J 31/0605* (2013.01)
(58) Field of Classification Search
CPC .................................................. A47J 31/0605
See application file for complete search history.

(56) References Cited

U.S. PATENT DOCUMENTS

| | | | |
|---|---|---|---|
| 4,924,922 A | 5/1990 | Johnson | |
| 9,375,113 B2 | 6/2016 | Sachtleben | |
| 2013/0247776 A1* | 9/2013 | Smit ....................... | A47J 31/44 |
| | | | 99/299 |
| 2015/0164265 A1 | 6/2015 | Cheng | |
| 2015/0359380 A1* | 12/2015 | Oleksy .................. | A47J 31/462 |
| | | | 426/433 |
| 2017/0251866 A1* | 9/2017 | Garcia ................ | A47J 31/4403 |
| 2020/0121113 A1* | 4/2020 | Harrod ................ | A47J 31/0626 |

FOREIGN PATENT DOCUMENTS

| | | | |
|---|---|---|---|
| CN | 108309054 A | 7/2018 | |
| DE | 33 07 338 A1 | 9/1984 | |
| DE | 33 12 354 A1 | 10/1984 | |
| EP | 2 700 337 B1 | 6/2016 | |
| WO | WO-2019000012 A1 * | 1/2019 | .......... A47J 31/0626 |

OTHER PUBLICATIONS

International Search Report in PCT/EP2021/074266, mailed Dec. 10, 2021.

* cited by examiner

*Primary Examiner* — Thien S Tran
(74) *Attorney, Agent, or Firm* — Collard & Roe, P.C.

(57) ABSTRACT

A filter holder for receiving a filter with extraction material, in particular ground coffee, has a receptacle portion having a bottom and at least one bottom-side flow-through opening on which a valve for opening and closing the flow-through opening is arranged. The valve can be moved by means of a linear actuator and can thus be controlled to set the brewing time. Further provided is a coffee machine having such a filter holder.

13 Claims, 4 Drawing Sheets

FILTER HOLDER AND COFFEE MACHINE

CROSS REFERENCE TO RELATED APPLICATIONS

This application is the National Stage of PCT/EP2021/074266 filed on Sep. 2, 2021, which claims priority under 35 U.S.C. § 119 of German Application No. 10 2020 124 966.7 filed on Sep. 24, 2020, the disclosure of which is incorporated by reference. The international application under PCT article 21(2) was not published in English.

The present invention relates to a filter holder for receiving a filter with extraction material, in particular ground coffee, comprising a receptacle portion having a bottom and at least one bottom-side flow-through opening to which a valve for opening and closing the flow-through opening is arranged, and a coffee machine.

U.S. Pat. No. 4,924,922 A discloses a drip-through lid for a coffee machine, in which a valve on a filter holder is opened by the insertion of a container. The valve is preloaded by a spring into a closed position, but remains open due to the arrangement of the container under the valve.

Disclosed in EP 2 700 337 B1 is a coffee machine having a filter holder, which has an outlet at a bottom which can be closed by a valve. The valve can be opened mechanically via a lever when a container is inserted under the filter holder so that the lever swivels and opens the valve. With this mechanical solution, the time of the hot water contacting the ground coffee can only be controlled manually. Due to the mechanical coupling, an unintentional run-on of coffee, which may have absorbed more bitter substances due to a prolonged contact time, cannot be avoided, since the valve is open only as long as the container is under the filter holder.

The object of the present invention is therefore to provide a filter holder having a valve arrangement that can be switched automatically.

This object is achieved with a filter holder having the features of claim 1.

According to the invention, the valve for opening and closing the flow-through opening at the bottom of the filter holder can be moved by means of a linear actuator. This allows the time period to be specified for which the extraction liquid with the extraction material remains in the filter of the filter holder. After completion of the extraction process, the valve closes the flow-through opening and no more liquid can escape from the filter holder. An electrical signal can be applied to the linear actuator to change the opening state, i.e. open or close the flow-through opening. This allows for a control function depending on sensor outputs, time interval, program sequences or the like.

Preferably, a curved body with at least one curved guide is provided between the valve and the linear actuator. This allows a movement of a moveable part of the linear actuator to be deflected in a different direction. For example, the valve can be movable in vertical direction and the moveable part of the linear actuator can be movable in horizontal direction, so that a very compact structure is obtained.

Preferably, the flow-through opening on the bottom side is connected via a tube or tubular channel to an outlet on the bottom side of the filter holder for dispensing an extraction liquid. This prevents contamination of the mechanics and electronics and ensures hygienic handling of a food product. The tube can be at least partially made of an elastic material. This can ensure a reliable seal at the ends of the tube. In addition, the tube can compensate for movement of the valve during opening or closing if the movable valve is connected to a section of the flexible tube via a tappet and connector.

When the valve is moved, the tube can be compressed by the stroke of the valve, for example with a stroke between 3 mm to 10 mm, especially 4 mm to 8 mm. For a particularly elastic design of the tube, it can comprise at least one bellows at an upper section between the flow-through opening and the connecting piece.

Preferably, a movable plunger of the linear actuator is passed through a tubular connector on the tube, which is movable with the valve in the vertical direction. This allows the linear actuator and curved body to be located on different sides of the tube for a compact design.

The linear actuator can preferably be fixed to an underside of the bottom, with a movable plunger of the linear actuator being passed through a channel of a connector on the tube, which is movable in the vertical direction together with the valve.

Between the base and an underside of the filter holder with an outlet for the extraction liquid, a closed hollow chamber is preferably formed in which the linear actuator is fixed. This is thus arranged in a protected manner from environmental influences.

The linear actuator is preferably designed as an electromagnetic solenoid that can be supplied with electric current. This allows control of the valve with low energy consumption. Alternatively, the linear actuator can also be designed as a spindle drive driven by an electric motor. Furthermore, the linear actuator can also be a hydraulic or pneumatic actuator.

The solenoid moving the valve assembly is preferably designed as a bistable linear solenoid, since it has exactly two discrete stable states. These two states can be converted into the valve's states, open or closed, by connecting them to the valve assembly. A change of state of the linear solenoid can be caused by applying a short electrical pulse, for example for a duration of 1 millisecond. As a result, the plunger core, in the plunger core bearing, is moved from one stable end position to another and remains there again.

The filter holder according to the invention is preferably held on a coffee machine by means of a bracket in a detachable, i.e. removable, manner and can thus be easily removed for a cleaning operation. Here the filter holder can be removed together with the linear actuator, in particular the electromagnetic solenoid, which can optionally be removed from the filter holder.

Preferably, the filter holder has electrical contacts which are connected to electrical contacts on the holder, wherein electrical signals for switching the linear actuator can be transmitted via the contacts. This allows, for example, the solenoid to be switched after electrical contact has been made.

The invention is explained in more detail below by means of an exemplary embodiment with reference to the accompanying drawings, in which.

Figure 1:
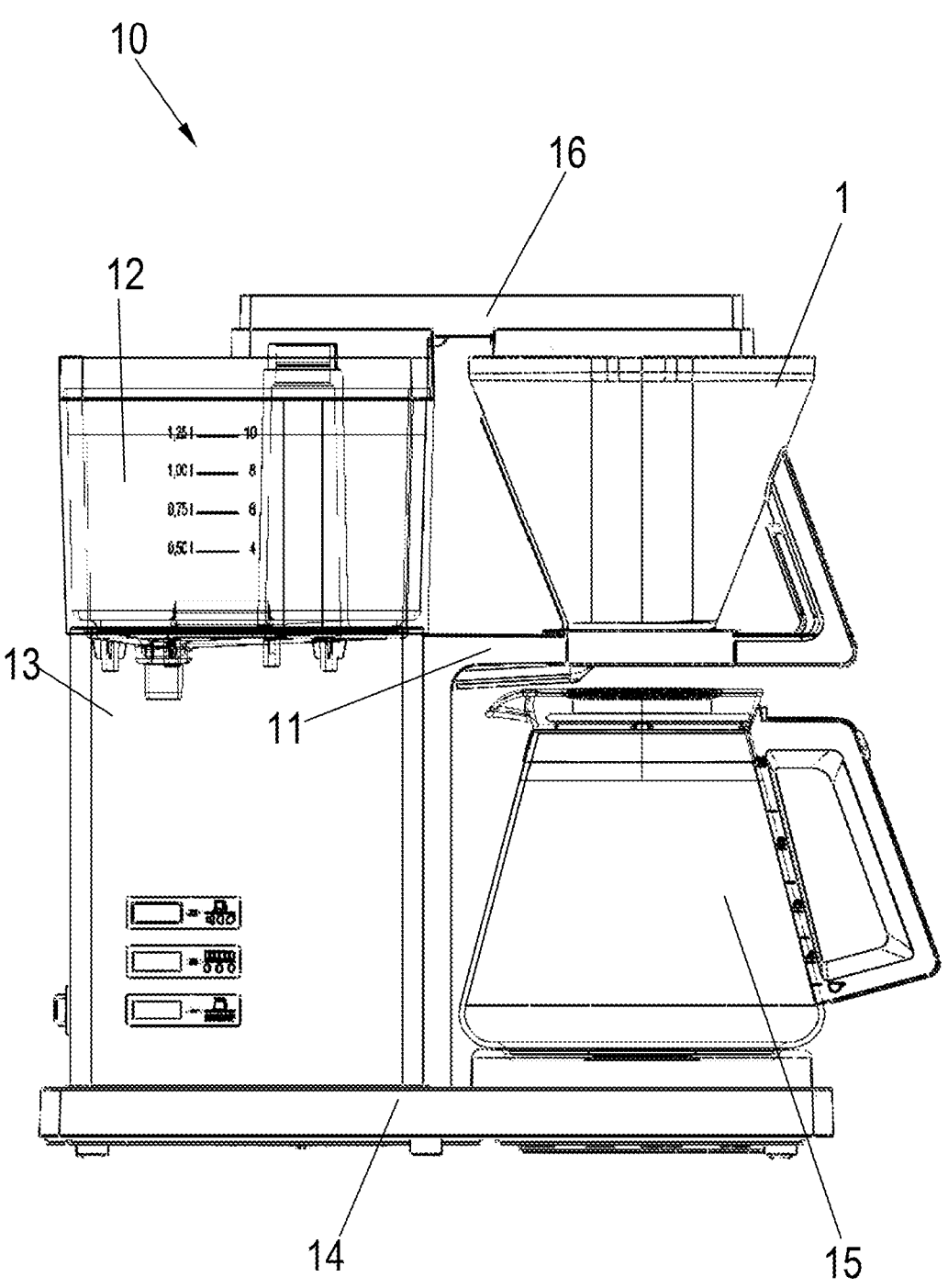
FIG. 1 shows a side view of a coffee machine according to the invention with a filter holder.

A coffee machine 10 comprises a water tank 12 arranged on a housing 13 with a control and operating unit. Water from the water tank 12 can be heated by a pump and a heater and directed to a hot water inlet 16 located above a filter holder 1. The housing 13 comprises a base plate 14 on which a container 15 is placed.

A filter, for example a filter paper insert with an extraction material such as ground coffee or tea, can be arranged in the filter holder 1. Here the filter holder 1 is arranged on a bracket 11 below the inlet 16 for hot water. Located under the filter holder 1 is the container 15, into which the extraction liquid from the filter holder 1 can be collected.

Figure 2:
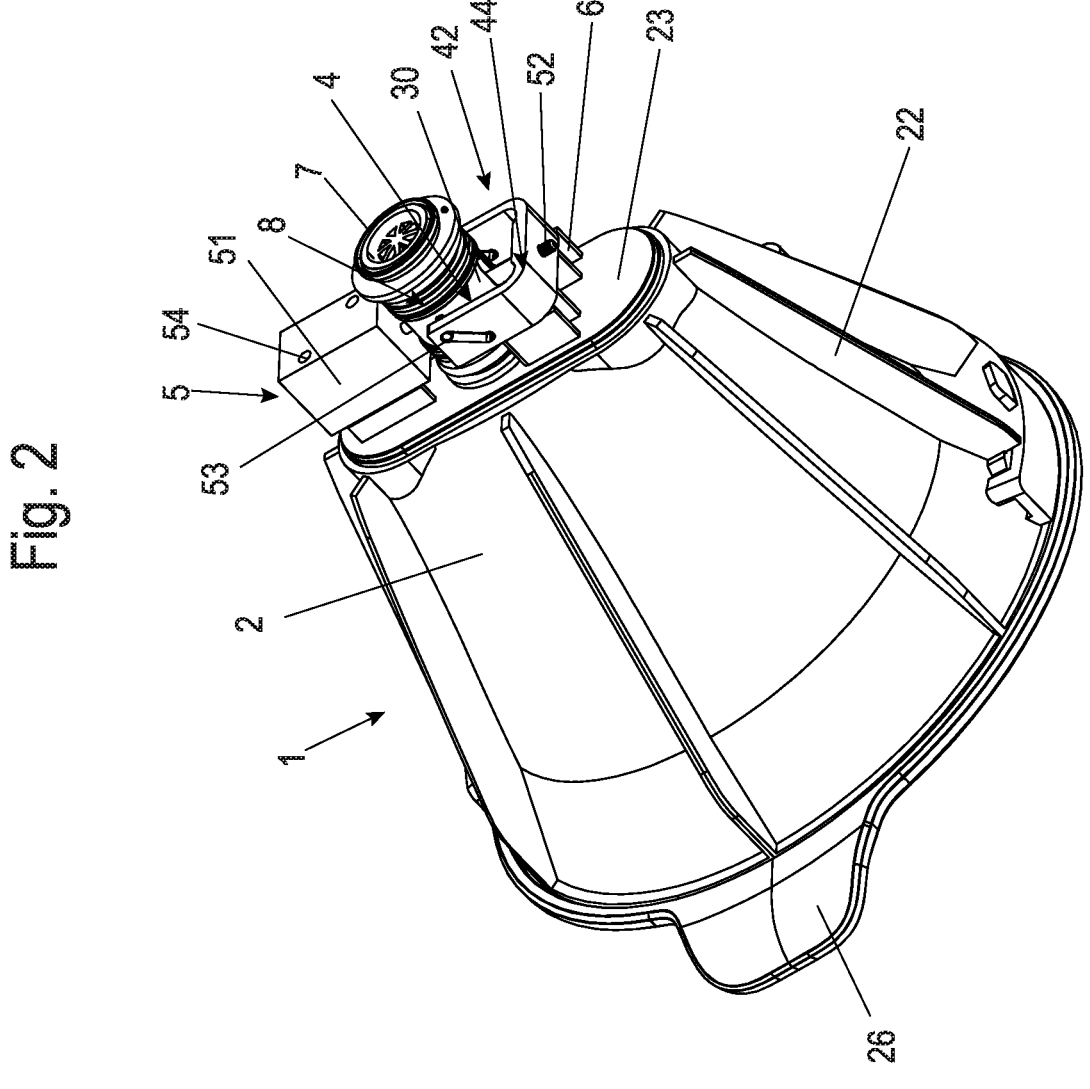
FIG. 2 shows a view of filter holder according to the invention without a coffee machine.
Figure 3:
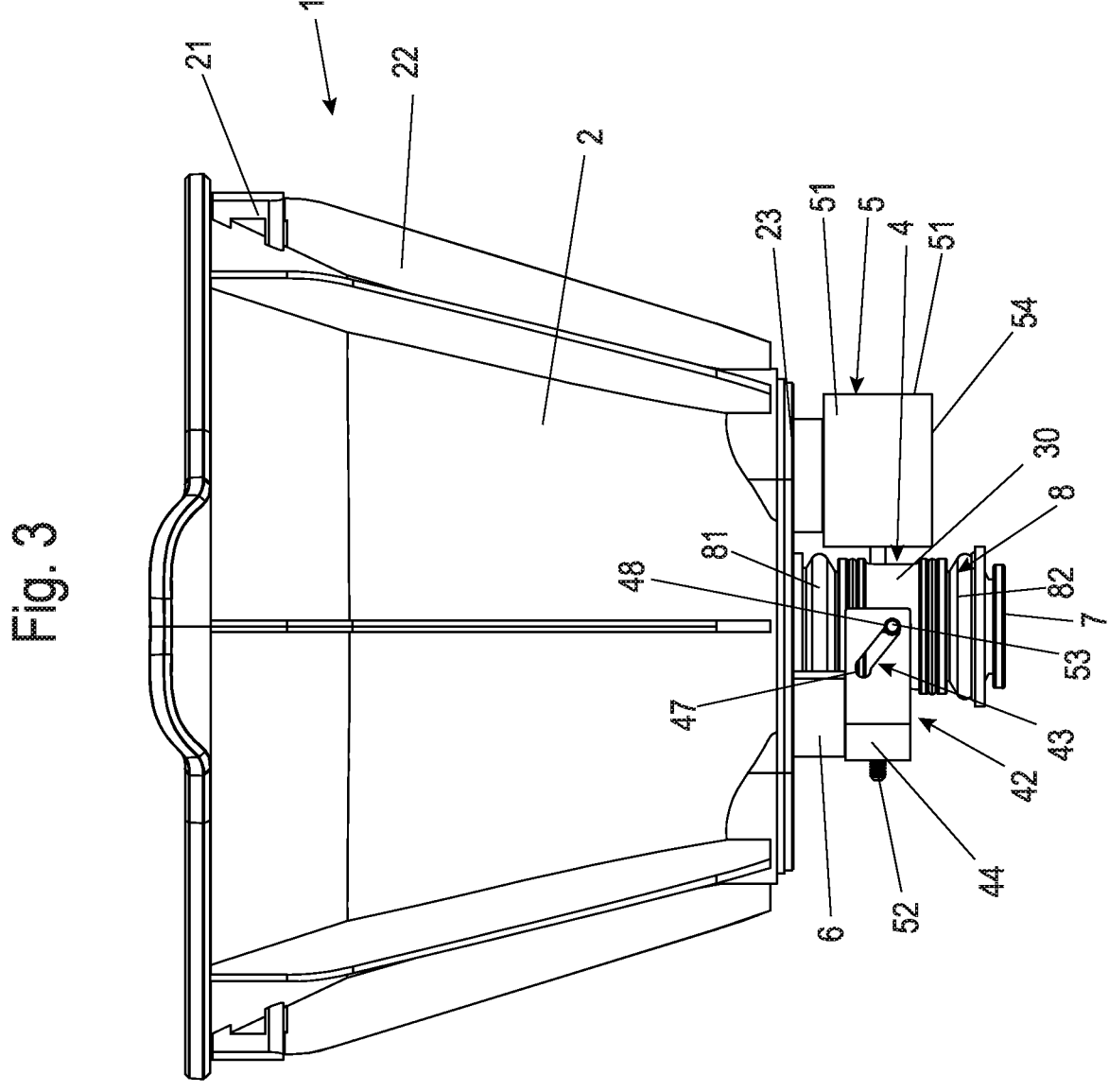
FIG. 3 shows a side view of the upper part of the filter holder with the valve assembly, and FIG. 4 a section through the side view of the filter holder in FIG. 3.

FIGS. 2 and 3 show the filter holder 1 without the coffee maker 10. The filter holder 1 comprises a receptacle portion 2 having an upwardly open receptacle for a filter, which tapers towards a bottom 23. Ribs 22 or other positioning means are provided on the outside of the receptacle portion 2 for positioning on the bracket 11. An outwardly projecting handle section 26 is formed on an upper ring of the receptacle portion 2, with which the filter holder 1 can be removed from and inserted into the bracket 11.

Provided at the bottom 23 of the filter holder 1 is a valve arrangement with a valve 4 for opening and closing a flow-through opening 3, which can be actuated by a linear actuator in the form of a solenoid 5. The solenoid 5 comprises a movable plunger 6 that moves a curved body 42 with curved guides 43 and which is designed as a linearly movable carriage 44. The carriage 44 is movable along a linear guide of the filter holder 1. In the assembled position, the carriage 44 is guided in the horizontal direction. The curved guide 43 can comprise an upper snap-in receptacle 47 and a lower snap-in receptacle 48, into which the tappet 53 can snap in a stable state. Optionally, the curved guide 43 can also be designed only as a slanted section without the snap-in receptacles 47 and 48.

The curved body 42 surrounds a tube 8 in a U-shape and has a curved guide 43 on both legs, in each of which a tappet 53 is guided. The two tappets 53 are fixed to the tube 8 by a connector 30.

Figure 4:
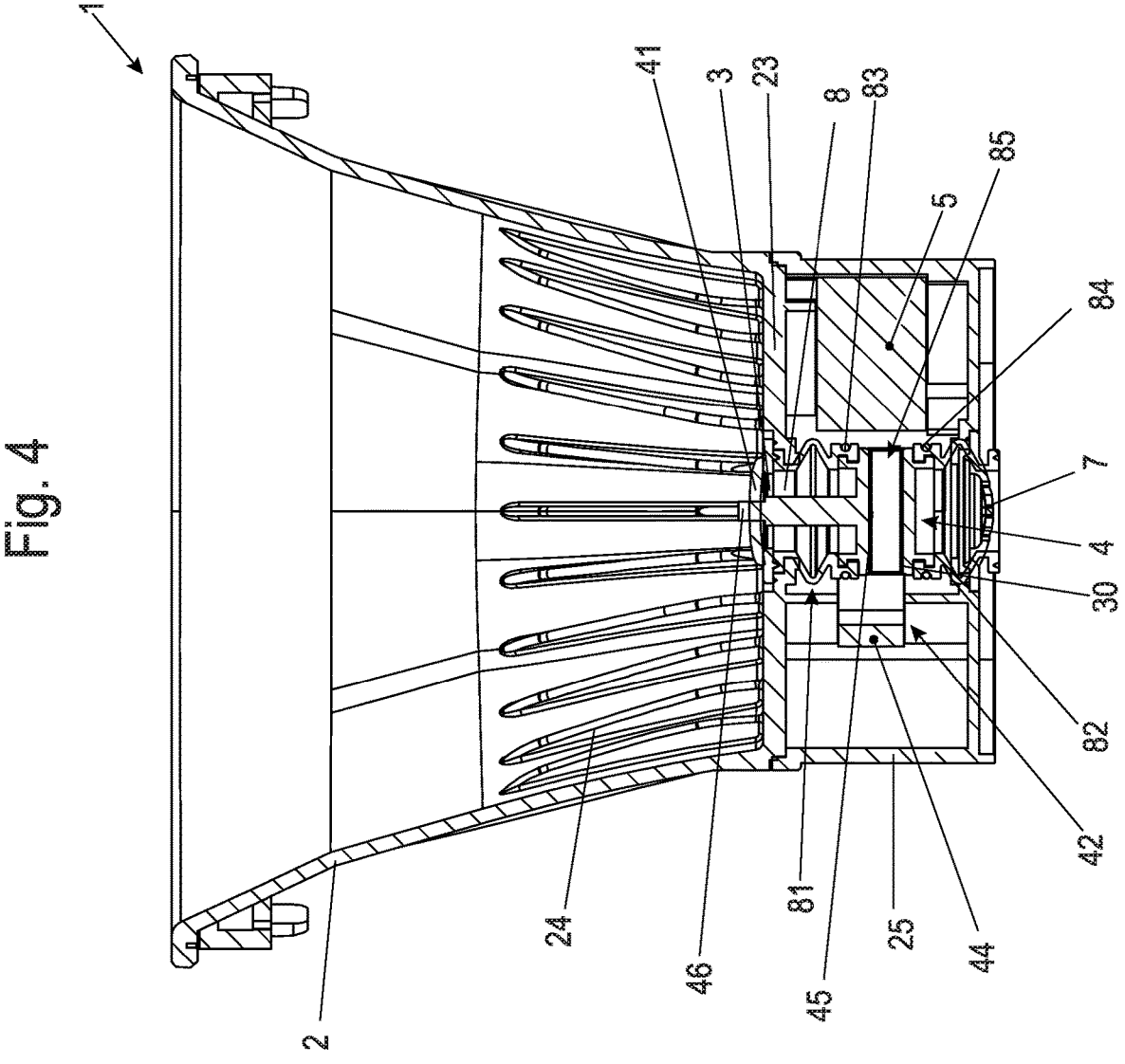

FIG. 4 shows a sectional view of the filter holder 1. The valve 4 is arranged on the bottom 23 at the flow-through opening 3 and seals this via a valve body in the closed position. The tube 8 is connected to the bottom 23 by an upper section 81, which is fixed to the connector 30 on the opposite side. The upper section 81 of the tube 8 includes a bellows, allowing vertical movement of the connector 30 relative to the bottom 23 without compromising the seal.

The connector 30 is connected to the outlet 7 at the underside of the filter holder 1 via a lower section 82 of the tube 8. The lower section 82 also includes a bellows to compensate for movement of the connector 30 relative to the outlet 7.

The bottom 23 with flow-through opening 3 is connected to the outlet 7 via the tube 8 and the solenoid 5 is isolated from the fluid channel in the tube 8. The solenoid 5 is protected in a hollow chamber of the filter holder 1.

The receptacle 2 comprises inner ribs 24 for positioning a filter, for example a filter paper insert in the receptacle portion 2. Fixed to the bottom 23 of the filter holder body 2 is a casing 25 that surrounds the tube 8 and the solenoid 5.

The horizontally displaceable curved body 42, which is held on the plunger 6 via the carriage 44, acts on the tappets 53, which are attached to or integrally formed on the connecting piece 30, via the curved guides 43. In this case, the connector 30 comprises a tubular bushing 45 for the plunger 6 of the solenoid 5, wherein the bushing 45 is movable in a vertical direction relative to the plunger 6. For this purpose, the bushing 45 can be oval or elongated in cross-section. The connector 30 forms a movable unit with the valve body 41. In this case, the valve body 41 has a pin projecting upward and a cover for closing the flow-through opening 3.

The tube 8 comprises the upper section 81 made of an elastic material, which is fixed to the connector 30 by means of a lower ring 83 and is fixed at the upper end to the flow-through opening 3 by means of a ring. In the closed position, the valve body 41 rests on the elastic ring for sealing.

The lower section 82 of the tube 8 is secured to the connector 30 by an upper ring 84, and forms a drain for the extraction fluid with a lower end. This allows the liquid to flow from the flow-through opening 3 within the tube 8 to the outlet 7, and the hollow chamber around the tube 8 is arranged to be protected from liquid.

The solenoid 5 is fixed to the bottom 23 of the filter holder 1 and comprises a plunger core bearing, which holds a plunger core in two stable positions. To supply power to the solenoid 5, leads are connected to electrical contacts which contact electrical contacts on the bracket 11 when the filter holder 1 is inserted into the bracket 11, so that the actuation of the solenoid 5 to open and close the valve 4 can be program-controlled and can be passed through an extraction liquid, in particular coffee. Optionally, the solenoid with the plunger 6 can also be disassembled from the filter holder 1 for a cleaning operation.

In the illustrated exemplary embodiment, a horizontal movement of the plunger 6 of the solenoid 5 is converted into a vertical movement of the valve 4. It is of course also possible to align the movement of the plunger 6 of the solenoid 5 not horizontally, but at a different angle relative to the movement of the valve 4. The actuation of the solenoid 5 can be program-controlled via the coffee machine 10.

In addition, the carriage 44 may be formed with the curved body 42 on the connector 30 so that the plunger 6 is connected to a tappet that engages in the curved guide.

In the embodiment shown, the linear actuator is designed as an electromagnetic solenoid that can be supplied with current. However, it is also possible to use a different linear actuator, for example a spindle drive driven by an electric motor, a hydraulic or a pneumatic actuator.

LIST OF DESIGNATIONS 1 filter holder
2 receptacle portion
3 flow-through opening
4 valve
5 solenoid
6 plunger
7 outlet
8 tube
9 bellows
10 coffee machine
11 bracket
12 water tank
13 housing
14 base plate
15 container
16 inlet
22 rib
23 bottom
24 inner rib
25 casing
26 handle section
30 connector
41 valve body
42 curved body
43 curved guide

44 carriage
45 bushing
47 upper snap-in receptacle
48 lower snap-in receptacle
53 tappet
81 upper section
82 lower section
83 lower ring
84 upper ring

The invention claimed is:

1. A filter holder (1) for receiving a filter with extraction material, comprising a receptacle portion (2) having a bottom (23) and at least one bottom-side flow-through opening (3) on which a valve (4) for opening and closing the flow-through opening (3) is arranged, wherein the valve (4) is configured to be moved by means of a linear actuator (5),
    wherein the flow-through opening (3) on the bottom side is connected via a tube (8) to an outlet (7) on the bottom side of the filter holder (1) for dispensing an extraction product,
    wherein the tube (8) is made of an elastic material,
    wherein the movable valve (4) is connected to an upper section (81) of the elastic tube (8) via a tappet (53) and a connector (30).

2. The filter holder as claimed in claim 1, further comprising a curved body (42) with at least one curved guide (43) provided between the valve (4) and the linear actuator (5).

3. The filter holder as claimed in claim 1, wherein the valve (4) is movable in a vertical direction and a plunger (6) of the linear actuator (5) is movable in a horizontal direction.

4. The filter holder as claimed in claim 1, wherein the linear actuator (5) is passed through the connector (30) on the tube (8), said connector being movable in a vertical direction with the valve (4) with the connector.

5. The filter holder as claimed in claim 1, wherein an upper section (81) of the tube (8) between the flow-through opening (3) and the connector (30) comprises at least one bellows.

6. A filter holder (1) for receiving a filter with extraction material, comprising a receptacle portion (2) having a bottom (23) and at least one bottom-side flow-through opening (3) on which a valve (4) for opening and closing the flow-through opening (3) is arranged, wherein the valve (4) is configured to be moved by means of a linear actuator (5),
    wherein the linear actuator (5) is fixed to an underside of the bottom (23), and a movable plunger (6) of the linear actuator (5) is passed through a bushing (45) of a connector (30) which is movable in the vertical direction together with the valve (4).

7. A filter holder (1) for receiving a filter with extraction material, comprising a receptacle portion (2) having a bottom (23) and at least one bottom-side flow-through opening (3) on which a valve (4) for opening and closing the flow-through opening (3) is arranged, wherein the valve (4) is configured to be moved by means of a linear actuator (5), wherein, between the bottom (23) and a lower side of the filter holder (1) with an outlet (7) for extraction liquid, a closed hollow chamber is formed in which the linear actuator (5) is fixed.

8. The filter holder as claimed in claim 1, wherein the linear actuator is designed as an electromagnetic solenoid (5) that is configured to be supplied with current.

9. The filter holder as claimed in claim 8, wherein the electromagnetic solenoid (5) is a bistable electromagnetic linear solenoid with two discrete states and stable end positions.

10. The filter holder as claimed in claim 2, wherein the curved body (42) surrounds a tube for passage of extraction liquid in a U-shape and wherein a respective curved guide (43) is formed on the curved body (42) on opposite sides of the tube (8).

11. A coffee machine with the filter holder (1) according to claim 1, wherein the filter holder (1) is detachably held on the coffee machine (10) by means of a bracket (11).

12. The coffee machine as claimed in claim 11, wherein the filter holder (1) has a closed hollow chamber in which the linear actuator (5) is fixed.

13. The coffee machine as claimed in claim 11, wherein the filter holder (1) has electrical contacts which are connected to electrical contacts on the bracket (11) and via which electrical signals for switching the linear actuator (5) can be transmitted.

\* \* \* \* \*